United States Patent
Kooiman et al.

(10) Patent No.: US 10,829,237 B2
(45) Date of Patent: Nov. 10, 2020

(54) TILTROTOR AIRCRAFT INLET-BARRIER FILTER METHOD AND APPARATUS

(71) Applicant: Bell Textron Inc., Fort Worth, TX (US)

(72) Inventors: James Everett Kooiman, Fort Worth, TX (US); George Ryan Decker, Mansfield, TX (US); Michael Rinehart, Euless, TX (US); Jeffrey Matthew Williams, Hudson Oaks, TX (US)

(73) Assignee: Bell Textron Inc., Fort Worth, TX (US)

( * ) Notice: Subject to any disclaimer, the term of this patent is extended or adjusted under 35 U.S.C. 154(b) by 235 days.

(21) Appl. No.: 15/906,108

(22) Filed: Feb. 27, 2018

(65) Prior Publication Data
US 2019/0263531 A1    Aug. 29, 2019

(51) Int. Cl.
*B01D 46/00*       (2006.01)
*B64D 33/02*       (2006.01)
*F02C 7/052*       (2006.01)
*B64C 29/00*       (2006.01)

(52) U.S. Cl.
CPC ......... *B64D 33/02* (2013.01); *B01D 46/0047* (2013.01); *F02C 7/052* (2013.01); *B01D 2279/60* (2013.01); *B64C 29/0033* (2013.01); *B64D 2033/0246* (2013.01); *B64D 2033/0253* (2013.01); *B64D 2033/0293* (2013.01)

(58) Field of Classification Search
CPC ............ B64D 33/02; B64D 2033/0246; B64D 2033/0253; B64D 2033/0293; B01D 46/0047; B01D 2279/60; F02C 7/052; B64C 29/0033; Y02T 50/672
See application file for complete search history.

(56) References Cited

U.S. PATENT DOCUMENTS

| | | | | |
|---|---|---|---|---|
| 3,998,048 A | * | 12/1976 | Derue | B64D 33/02 60/39.092 |
| 4,397,431 A | * | 8/1983 | Ben-Porat | B64D 33/02 244/53 B |
| 5,697,394 A | * | 12/1997 | Smith | B64D 33/02 137/15.1 |
| 6,896,003 B1 | * | 5/2005 | Gieseke | B63G 8/32 114/239 |
| 10,054,050 B2 | * | 8/2018 | Labrecque | F02K 3/025 |

(Continued)

OTHER PUBLICATIONS

Haynes, David, "U.S. Appl. No. 16/294,266", filed Mar. 6, 2019.

*Primary Examiner* — Dung H Bui
(74) *Attorney, Agent, or Firm* — Shackelford, Bowen, McKinley & Norton, LLP

(57) ABSTRACT

An inlet barrier filter system for a tiltrotor aircraft comprising a filter duct extending from a filter to a filter outlet, a ram air duct extending from a ram air inlet to an engine where the filter duct connects to the ram air duct at the filter outlet, and a closure member movable between a first position blocking the ram air duct and a second position blocking the filter outlet. In use, the inlet barrier filter system provides for two mutually exclusive air flow paths, one for introducing ram air to the engine while closing off the filter and another air flow path for introducing filtered air to the engine while closing off the ram air duct.

20 Claims, 4 Drawing Sheets

(56) References Cited

U.S. PATENT DOCUMENTS

| | | | |
|---|---|---|---|
| 2009/0261208 A1* | 10/2009 | Belyew | B01D 46/10 |
| | | | 244/53 B |
| 2011/0120075 A1* | 5/2011 | Diaz | B64D 29/00 |
| | | | 60/39.11 |
| 2011/0265650 A1* | 11/2011 | Kazlauskas | B64D 33/02 |
| | | | 95/269 |
| 2014/0077039 A1* | 3/2014 | Scimone | B64C 27/28 |
| | | | 244/23 B |
| 2015/0048213 A1 | 2/2015 | Ross et al. | |
| 2016/0075439 A1* | 3/2016 | Mores | B64D 33/02 |
| | | | 244/53 B |
| 2016/0347479 A1 | 12/2016 | O'Neil et al. | |
| 2018/0030926 A1* | 2/2018 | Eckett | F02K 1/72 |
| 2018/0043986 A1* | 2/2018 | Miller | B64C 29/0033 |
| 2018/0105283 A1* | 4/2018 | Dionne | B64D 41/00 |
| 2018/0208323 A1* | 7/2018 | Parsons | B64D 33/02 |

* cited by examiner

TILTROTOR AIRCRAFT INLET-BARRIER FILTER METHOD AND APPARATUS

BACKGROUND

This section provides background information to facilitate a better understanding of the various aspects of the disclosure. It should be understood that the statements in this section of this document are to be read in this light, and not as admissions of prior art.

Rotor systems of rotorcraft and tiltrotor aircraft may include inlet barrier filters that filter air directed into the engine of the rotor system. Inlet barrier filters serve to separate dust, sand, and debris from engine inlet air in harsh environmental conditions. Generally, an engine of a tiltrotor aircraft is housed in a nacelle that is mounted to a wing. Space constraints, specific to tiltrotor aircraft, limit the placement of an inlet barrier filter in the fore and aft directions along the nacelle. Depending on design of the tiltrotor aircraft, the nacelle and engine may or may not pivot with the prop rotors.

Nacelles include a forward facing ram air inlet leading to a duct for introducing ram air to the engine when the tiltrotor aircraft is travelling generally horizontally in cruise mode. The inlet barrier filter is typically located on a side of the nacelle and also leads to the duct. Inlet barrier filters are in use when the rotorcraft or tiltrotor aircraft is in hover mode near the ground or when sitting on the ground as this is the time when debris is most likely to be kicked up by the rotor blades of the rotor systems and ingested by the engine. An example of inlet barrier filter system, owned by the present Applicant, is disclosed in U.S. Patent Application Publication No. 2018/0043986. In current tiltrotor aircraft, when the inlet barrier filter is in use, unfiltered air is partially blocked from entering the engine via the forward facing ram air inlet by a butterfly valve positioned within the duct near the ram air inlet thus forcing most air ingested by the engine during hover mode to pass through the inlet barrier filter. Not only does the butterfly valve not block all air from entering the ram air inlet during hover mode, but it also does not block air from entering or exiting through the inlet barrier filter during cruise mode. This style of ram air inlet and inlet barrier filter relies on a plenum chamber ahead of the engine which both the ram air inlet and the filter inlet feed. This plenum chamber, along with the butterfly valve located inside the ram air inlet, can compromise engine performance during cruise.

SUMMARY

An example inlet barrier apparatus for a tiltrotor aircraft includes a ram-air flow path extending from a ram air inlet to a port configured to connect to an engine, a filtered-air flow path extending from a filter inlet to the port, and a closure member movable between a first position opening the filtered-air flow path and closing the ram-air flow path and a second position closing the filtered-air flow path and opening the ram-air flow path.

An example inlet barrier filter system for a tiltrotor aircraft includes a ram air duct formed in a nacelle and extending from a ram air inlet to an engine, a filter duct formed in the nacelle and extending from a filter inlet to a filter outlet in communication with the ram air duct, and a closure member connected with the nacelle and movable about a single pivot point between a first position blocking the ram air duct and a second position blocking the filter outlet.

An example method includes operating a tiltrotor aircraft comprising an inlet barrier filter system including an inlet barrier door, wherein the operating comprises moving the inlet barrier door between a first position opening a first air flow path of filtered air to an engine inlet and closing a second air flow path of unfiltered ram air to the engine outlet and a second position closing the first air flow path and opening the second air flow path, wherein the first air flow path and the second air flow path are not open contemporaneously.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
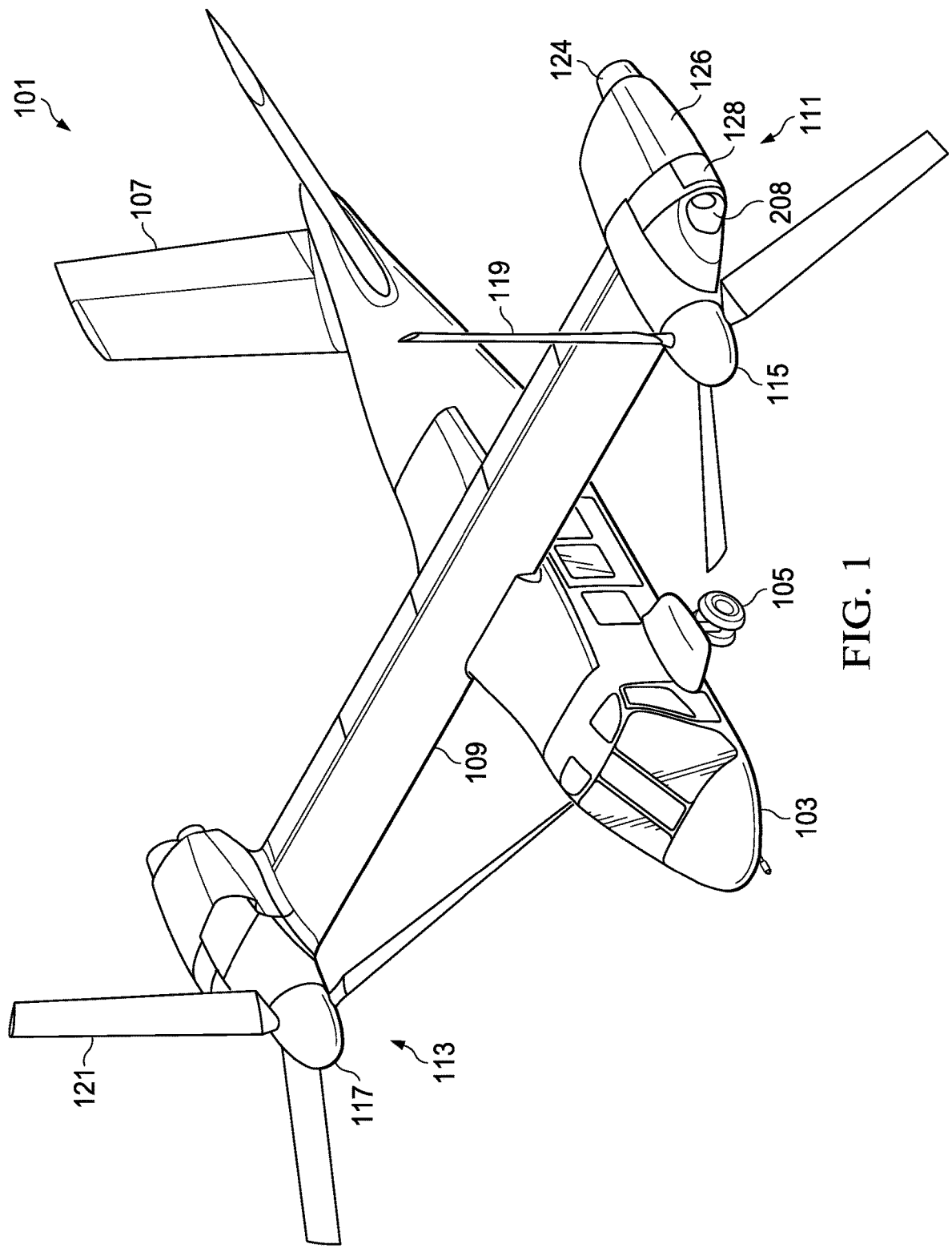
FIG. 1 is a perspective view of a tiltrotor aircraft in a cruise mode position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Referring to FIG. 1, tiltrotor aircraft 101 is illustrated. Tiltrotor aircraft 101 may include fuselage 103, landing gear 105, tail member 107, wing 109, propulsion system 111, and propulsion system 113. Fuselage 103 represents the body of tiltrotor aircraft 101 and may be coupled to propulsion systems 111, 113 such that the propulsion systems may move tiltrotor aircraft 101 through the air. Landing gear 105 supports tiltrotor aircraft 101 when tiltrotor aircraft 101 is landing or when tiltrotor aircraft 101 is at rest on the ground.

Each propulsion system 111, 113 includes engine 124 housed within nacelle 126. Nacelle 126 includes filter area 128. Each propulsion system 111, 113 includes pivotable proprotors 115, 117 operatively connected to a respective engine. Engine 124 and nacelle 126 may pivot with proprotors 115, 117 between airplane mode and helicopter mode.

Each proprotor 115, 117 has a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101. FIG. 1 illustrates tiltrotor aircraft 101 in airplane or cruise mode, in which proprotors 115, 117 are positioned substantially horizontal to provide forward thrust in which a lifting force is supplied by wing 109. When proprotors 115, 117 are positioned substantially vertical, tiltrotor aircraft 101 is in helicopter or hover mode and the proprotors provide lifting thrust. It should be appreciated that tiltrotor aircraft 101 can be operated such that proprotors 115, 117 are selectively positioned between airplane mode and helicopter mode, which can be referred to as a conversion mode.

Propulsion systems 111 and 113 are illustrated in the context of tiltrotor aircraft 101; however, propulsion systems 111 and 113 can be implemented on other proprotor or tiltrotor aircraft, for example, a quad tiltrotor, an unmanned version of tiltrotor aircraft 101, or a tiltrotor aircraft where the engines and filter areas may be embedded in the fuselage.

Figure 2:
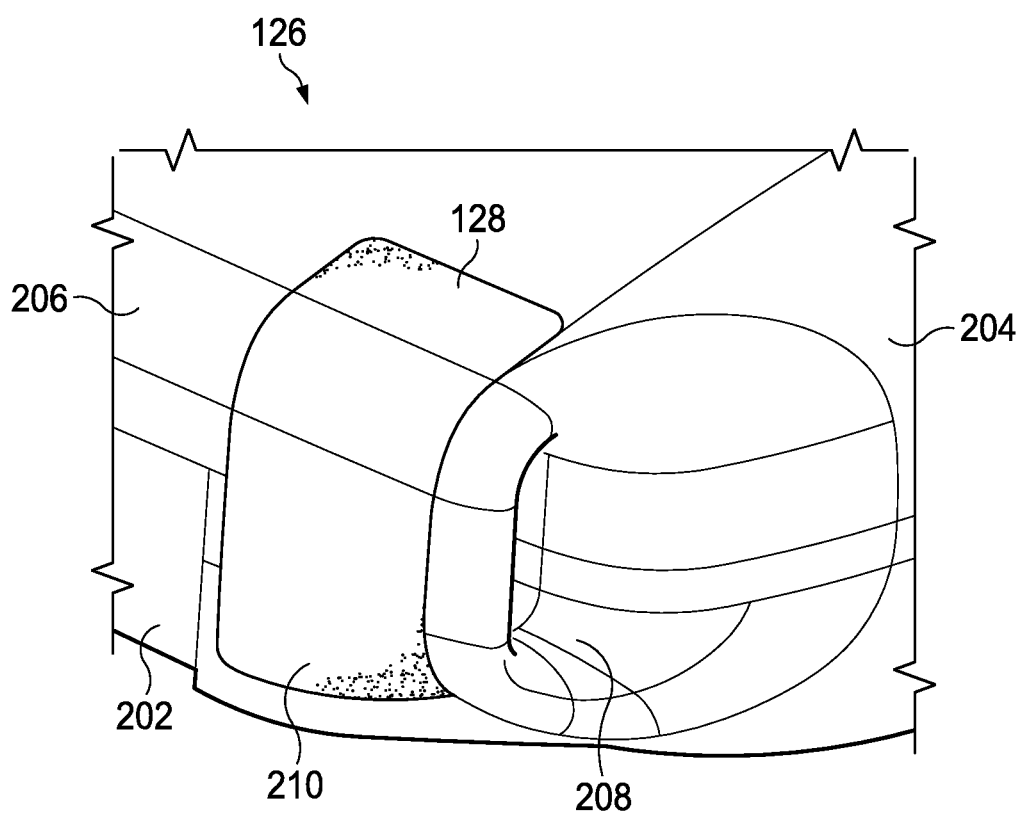
FIG. 2 is a partial perspective view of a nacelle of a tiltrotor aircraft according to aspects of the disclosure.
Figure 3:
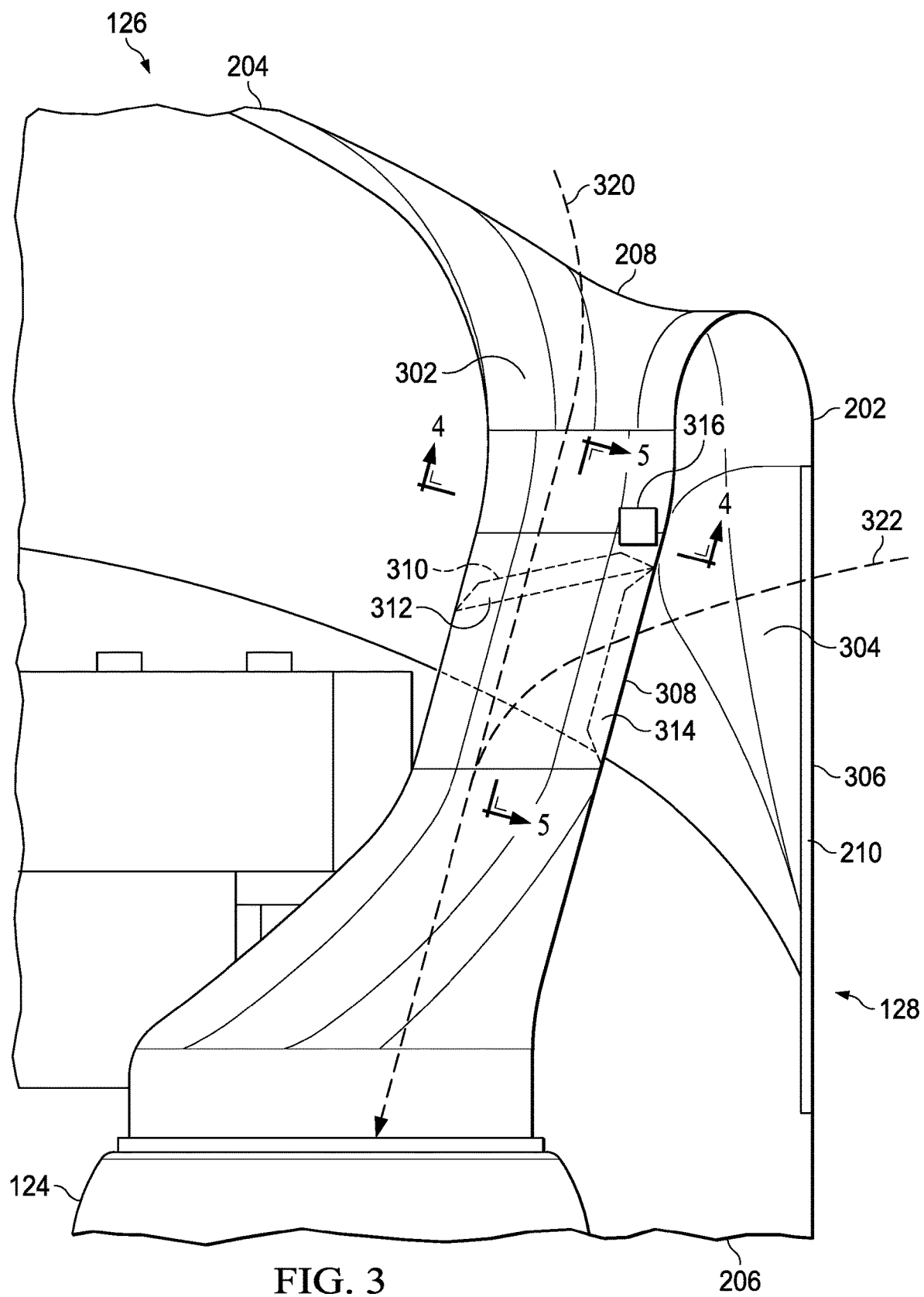
FIG. 3 is a partial top view of a nacelle of a tiltrotor aircraft depicting inlets leading to an engine air duct according to one or more aspects of the disclosure.

Referring to FIG. 2, a partial view of nacelle 126 is shown. Nacelle 126 includes side 202 (e.g., top, bottom, and lateral sides) extending between fore end 204 and aft end 206. Nacelle 126 includes ram air inlet 208 positioned in fore end 204. Ram air inlet 208 is a forward facing opening leading to duct 302 (FIG. 3). Duct 302 directs ram air that enters ram air inlet 208 to engine 124. A ram air inlet is any intake design which uses the dynamic air pressure created by vehicle motion to increase the static air pressure inside of the intake manifold on a turboshaft or internal combustion engine, thus allowing a greater mass flow through the engine and hence increasing engine power. Ram air inlet 208 is forward facing to take advantage of dynamic air pressure created during cruise mode as tiltrotor aircraft 101 moves in generally horizontal flight. Filter area 128 includes filter 210 affixed to nacelle 126 at side 202. It will be understood by those skilled in the art with the benefit of this disclosure that filter area 128 is not limited to a lateral side location on the nacelle and could be positioned anywhere on the nacelle or fuselage where space permits depending on aircraft configuration. Filter 210 serves to separate dust and debris from the air drawn in through filter area 128 as tiltrotor aircraft 101 hovers near the ground surface or prepares for vertical take-off.

As illustrated in FIG. 3, ram air inlet 208 is a forward facing opening that leads to duct 302. Duct 302 extends from ram air inlet 208 to engine 124 (e.g., a port to an engine). Filter 210 is affixed to side 202 (e.g., top, bottom, and/or lateral side) within filter area 128. Filter 210 covers filter inlet 306. Filter inlet 306 is an opening that leads to filter duct 304 from filter area 128. Filter duct 304 extends from filter inlet 306 to filter outlet 308 which is in communication with duct 302.

Actuator 316 is operatively connected to closure member 310 to move closure member 310 about a single pivot point between positions 312 and 314. In the illustrated example, actuator 316 is connected with nacelle 126. Actuator 316 may be connected to a duct or other structure. Movement of closure member 310 may be programmable or pilot selectable. Actuator 316 may include, without limitation, an electric actuator, hydraulic actuator, and pneumatic actuator (e.g., pneumatic muscle). The actuator may include, for example, a linear or rotational shaft.

Figure 4:
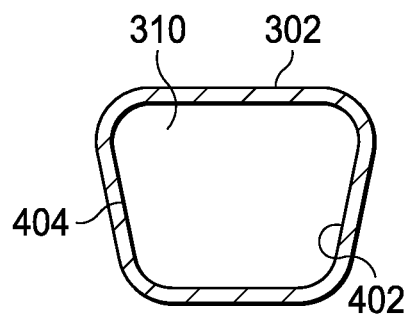
FIG. 4 is a partial cross-section view of a duct according to one or more aspects of the disclosure taken along line 4-4 of FIG. 3.

As shown in FIG. 4, duct 302 has cross-section shape 402. Closure member 310 has exterior contour 404 that generally matches the cross-section shape 402 of duct 302. Because cross-section 402 generally matches contour 404, when closure member 310 is in position 312, closure member 310 blocks (e.g., closes), or substantially closes duct 302 fore of filter outlet 308 (i.e., between inlet 208 and filter outlet 308) proximate ram air inlet 208. As will be understood by those skilled in the art with benefit of this disclosure, a complete seal may or may not be formed between closure member 310 and duct 302.

Figure 5:
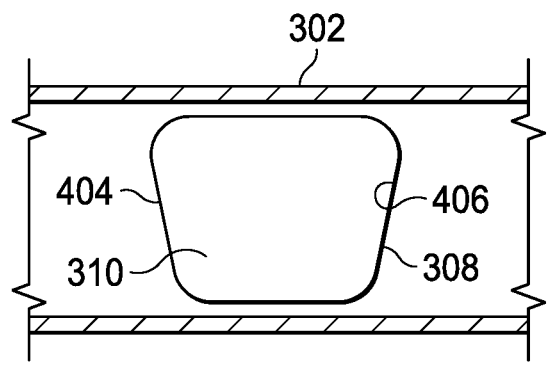
FIG. 5 is a partial cross-section view of a filter outlet according to one or more aspects of the disclosure taken along line 5-5 of FIG. 3.

As shown in FIG. 5, filter outlet 308 has cross-section shape 406. Exterior contour 404 of closure member 310 generally matches cross-section shape 406 of filter outlet 308. Because cross-section 406 generally matches contour 404, when closure member 310 is in position 314, closure member 310 blocks (e.g., closes), or substantially closes filter outlet 308. As will be understood by those skilled in the art with benefit of this disclosure, a complete seal may or may not be formed between closure member 310 and filter outlet 308.

In use, closure member 310 is actuated to position 312 to supply filtered air to the engine. In position 312, closure member 310 blocks duct 302 preventing, or substantially preventing, the air flow through ram air inlet 208 from reaching engine 124 and opens a filtered air path from filter inlet 306, through filter duct 304, through filter outlet 308, to engine 124. Position 312 is utilized, for example, when tiltrotor aircraft 101 is near the ground surface where dust and debris is more likely to be kicked up thus requiring the need to filter the engine air. Position 312 is most often used when tiltrotor aircraft 101 is in hover mode to block dust and/or debris from reaching the engine.

In use, closure member 310 is actuated to position 314 to supply ram air to the engine. In position 314, closure member 310 blocks filter outlet 308 preventing, or substantially preventing, the air flow (i.e., communication) between duct 302 and filter duct 304 and opens the air flow path from ram air inlet 208 to engine 124. Little to no air that enters filter inlet 306 can reach engine 124 when closure member 310 is in position 314 and little to no air that enters ram air inlet 208 can pass through filter outlet 308 and filter inlet 306. Position 314 is most often used when tiltrotor aircraft 101 is in cruise mode and the engine requires or would benefit from ram air delivered directly to the engine.

When closure member 310 is in position 314, duct 302 extends directly from ram air inlet 208 to the face of engine 124 providing air flow path 320. Air flow path 320 passes through duct 302. When closure member 310 is in position 312, duct 302 is blocked fore of filter outlet 308. When closure member 310 is in position 312, duct 304 is open at filter outlet 308 and open to duct 302 providing filtered air flow path 322 from the filter inlet to the engine. Filtered air flow path 322 passes through duct 304, filter outlet 308, and through duct 302 aft of filter outlet 308 to the engine. Closure member 310, movable between two distinct positions, provides two mutually exclusive paths 320, 322 for air flow. Closure member 310, movable between two positions, provides the ability to close off the ram air inlet and open a filtered air flow path from filter inlet 306 to the engine face or to close off the filtered air inlet and provide a true clean duct (duct 302) from ram air inlet 208 directly to the engine face. Because closure member 310 is movable between positions 312 and 314 and rests only in either position 312 or 314, except during transition between positions 312 and 314, each propulsion system has a singular path for air flow.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An inlet barrier apparatus for a tiltrotor aircraft, comprising:
    a ram-air flow path formed in a nacelle extending from a ram-air inlet to a port configured to connect to an engine;
    a filtered-air flow path formed in the nacelle extending from a filter inlet to the port, in use the filter inlet comprising a filter; and
    a closure member movable about a single pivot point between a first position opening the filtered-air flow path and closing the ram-air flow path and a second position closing the filtered-air flow path and opening the ram-air flow path.

2. The inlet barrier apparatus of claim 1, wherein the ram-air flow path comprises a first duct extending from the ram air inlet to the port and the filtered-air flow path comprises a second duct extending from the filter inlet to a filter outlet in communication with the first duct.

3. The inlet barrier apparatus of claim 2, wherein in the first position the closure member closes the first duct and in the second position the closure member closes the second duct.

4. The inlet barrier apparatus of claim 2, wherein in the first position the closure member closes the first duct fore of the filter outlet.

5. The inlet barrier apparatus of claim 2, wherein in the second position the closure member closes the filter outlet.

6. The inlet barrier apparatus of claim 2, wherein the filter outlet has a cross-section and the closure member has an exterior contour that matches the cross-section.

7. The inlet barrier apparatus of claim 2, wherein:
    the first duct has a first cross-section shape;
    the filter outlet has a second cross-section shape;
    the closure member has an external contour; and
    the external contour matches the first cross-section shape and the second cross-section shape.

8. An inlet barrier filter system for a tiltrotor aircraft, comprising:
    a ram air duct formed in a nacelle and extending from a ram air inlet to an engine;
    a filter duct formed in the nacelle and extending from a filter inlet to a filter outlet in communication with the ram air duct; and
    a closure member connected with the nacelle and movable about a single pivot point between a first position blocking the ram air duct and a second position blocking the filter outlet.

9. The inlet barrier filter system of claim 8, comprising a solitary air flow path of the inlet barrier filter system through the filter duct when the closure member is in the first position.

10. The inlet barrier filter system of claim 8, comprising a solitary air flow path of the inlet barrier filter system through the ram air duct when the closure member is in the second position.

11. The inlet barrier filter system of claim 8, comprising:
    a first air flow path through the filter duct when the closure member is in the first position;
    a second air flow path through the ram air duct when the closure member is in the second position; and
    wherein the first air flow path does not coexist with the second air flow path when the closure member is in the first position or the second position.

12. The inlet barrier filter system of claim 8, wherein the filter outlet has a cross-section and the closure member has an exterior contour that matches the cross-section.

13. The inlet barrier filter system of claim 8, wherein the closure member has an external contour that matches a cross-sectional shape of the ram air duct and a cross-sectional shape of the filter outlet.

14. The inlet barrier filter system of claim 8, wherein in the first position, the closure member blocks the ram air duct fore of the filter outlet.

15. A method, comprising:
    operating a tiltrotor aircraft comprising an inlet barrier filter system including an inlet barrier door, wherein the operating comprises moving the inlet barrier door about a single pivot point between a first position opening a first air flow path of filtered air to an engine inlet and closing a second air flow path of unfiltered ram air to the engine inlet and a second position closing the first air flow path and opening the second air flow path, wherein the first air flow path and the second air flow path are not open contemporaneously.

16. The method of claim 15, wherein the inlet barrier filter system comprises:
    a ram air inlet leading to a first duct;
    a filter inlet leading to a second duct; and
    the inlet barrier door blocks the second duct when the inlet barrier door is in the second position.

17. The method of claim 15, wherein the inlet barrier filter system comprises:
    a ram air inlet leading to a first duct;
    a filter inlet leading to a second duct; and
    the inlet barrier door blocks the first duct proximate the ram air inlet when the inlet barrier door is in the first position.

18. The method of claim 15, wherein the inlet barrier filter system comprises:
    a first duct extending from a ram air inlet to an engine inlet; and
    a second duct extending from a filter inlet to a filter outlet in communication with the first duct, wherein the second air flow path extends between the ram air inlet and the engine inlet.

19. The method of claim 15, wherein the inlet barrier filter system further comprises:

a first duct extending from a ram air inlet to an engine inlet; and a second duct extending from a filter inlet to a filter outlet in communication with the first duct, wherein the first air flow path extends between the filter inlet and the engine inlet.

20. The method of claim 15, wherein:

a ram air inlet leading to a first duct, where the first duct has a first cross-section shape;

a second duct leading to a filter outlet, wherein the filter outlet connects the second duct to the first duct and the filter outlet has a second cross-section shape;

the inlet barrier door has an external contour; and the external contour matches the first cross-section shape and the second cross-section shape.

* * * * *